(12) United States Patent
Brunton et al.

(10) Patent No.: US 12,038,736 B2
(45) Date of Patent: Jul. 16, 2024

(54) ADDITIVE MANUFACTURING CONTROL BASED ON DISPLACED SIGNED DISTANCE FIELDS

(71) Applicant: Fraunhofer Gesellschaft zur Förderung der angewandten Forschung e.V., Munich (DE)

(72) Inventors: Alan Brunton, Grenoble (FR); Lubna Abu Rmaileh, Darmstadt (DE)

(73) Assignee: Fraunhofer Gesellschaft zur Förderung der angewandten Forschung e. V., Munich (DE)

( * ) Notice: Subject to any disclaimer, the term of this patent is extended or adjusted under 35 U.S.C. 154(b) by 246 days.

(21) Appl. No.: 17/547,055

(22) Filed: Dec. 9, 2021

(65) Prior Publication Data
US 2022/0187790 A1 Jun. 16, 2022

(30) Foreign Application Priority Data
Dec. 11, 2020 (DE) ...................... 10 2020 215 766.9

(51) Int. Cl.
*G06T 7/70* (2017.01)
*B33Y 50/02* (2015.01)
(Continued)

(52) U.S. Cl.
CPC .......... *G05B 19/4099* (2013.01); *B33Y 50/02* (2014.12); *G06T 7/70* (2017.01); *G05B 2219/49007* (2013.01); *G06T 2200/04* (2013.01)

(58) Field of Classification Search
CPC ....... G06T 7/70; G06T 2200/04; G06T 15/08; G06T 15/005; G06T 15/503; G06T 1/20;
(Continued)

(56) References Cited

U.S. PATENT DOCUMENTS 10,137,646 B2 11/2018 Stevens et al.
10,354,445 B2 7/2019 Greene et al.
(Continued)

OTHER PUBLICATIONS

M. Alexa et al., Optimal Discrete Slicing, ACM Transactions on Graphics, vol. 36, No. 1, Article 12, ACM, Inc., New York, NY, Jan. 2017.
(Continued)

*Primary Examiner* — Wesner Sajous
(74) *Attorney, Agent, or Firm* — Miller Johnson (57) ABSTRACT

A method is described for selecting voxels for producing a three-dimensional object with an additive manufacturing device. The additive manufacturing device has a building space that is discretized into virtual voxels. The method includes receiving a voxel-based approximation of a surface of the object. The voxel-based approximation includes multiple voxels. The method includes determining, for each voxel of a non-empty subset of the voxels, a signed distance value describing a distance between the voxel and at least one point defined by the voxel-based approximation. The signed distance value of the voxel is determined based on a displacement value describing a topographic characteristic of the voxel-based approximation. The method includes selecting voxels at which material should be added to produce the object. The selection is performed based on the signed distance values of the voxels.

20 Claims, 1 Drawing Sheet

(51) Int. Cl.
- G03G 15/22 (2006.01)
- G05B 19/40 (2006.01)
- G05B 19/4099 (2006.01)
- G06F 30/00 (2020.01)
- G06T 1/20 (2006.01)
- G06T 15/00 (2011.01)
- G06T 17/00 (2006.01)

(58) Field of Classification Search
CPC ..... G06T 17/00; G06T 17/20; G05B 19/4099; G05B 2219/49007; G05B 2219/49023; G03G 15/224; B33Y 50/00; B33Y 50/02; B29C 64/393; B29C 64/386; G06F 30/00; G06F 30/17; G06F 30/23; G06F 2119/18; G06F 2113/10

See application file for complete search history.

(56) References Cited

U.S. PATENT DOCUMENTS

| | | | |
|---|---|---|---|
| 10,510,177 | B2 | 12/2019 | Lefebvre et al. |
| 11,024,075 | B2* | 6/2021 | Courter ............... G06T 15/005 |
| 11,625,889 | B2* | 4/2023 | Courter ............... B29C 64/393 |
| | | | 345/424 |
| 2014/0324204 | A1 | 10/2014 | Vidimce et al. |
| 2018/0240263 | A1* | 8/2018 | Courter ............... B29C 64/393 |
| 2019/0134915 | A1* | 5/2019 | Schmidt ............... G06T 17/20 |
| 2020/0035015 | A1* | 1/2020 | Courter ............... G06T 15/005 |
| 2020/0142384 | A1 | 5/2020 | Bressler |
| 2020/0331207 | A1 | 10/2020 | Liu |
| 2020/0346411 | A1 | 11/2020 | Arad et al. |
| 2021/0279944 | A1* | 9/2021 | Courter ............... G06T 1/20 |

OTHER PUBLICATIONS

M. Attene, A lightweight approach to repairing digitized polygon meshes, Vis Comput (2010) 26, pp. 1393-1406, Springer-Verlag, Genova, Italy, Feb. 10, 2010.
M. Atzmon et al., SAL: Sign Agnostic Learning of Shapes from Raw Data, Weizmann Institute of Science, Rehovot, Israel, CVPR 2020.
M. Atzmon et al., SALD: Sign Agnostic Learning with Derivatives, Weizmann Institute of Science, Oct. 3, 2020.
G. Barill, Fast Winding Numbers for Soups and Clouds, ACM Transactions on Graphics, vol. 37, No. 4, Article 43, Published Aug. 2018.
M. Berger et al., A Survey of Surface Reconstruction from Point Clouds, Computer Graphics forum, vol. 36 (2017), No. 1, pp. 301-329.
S. Bischoff, et al., Automatic Restoration of Polygon Models, ACM Transactions on Graphics, vol. 24, No. 4, Oct. 2005, pp. 1332-1352.
A. Brunton, et al., 3D Printing Spatially Varying Color and Translucency, AMC Transactions of Graphics, vol. 37, No. 4, Article157, Published Aug. 2018.
T. Davies et al., Overfit Neural Networks as a Compact Shape Representation, The Authors, Sep. 17, 2020.
E. Eisemann, Single-Pass GPU Solid Voxelization for Real-Time Applications, Graphics Interface Conference 2008, Windsor, Ontario, Canada.
P. Erler, Points2Surf Learning Implicit Surfaces from Point Clouds, Spring Nature Switzerland AG 2020, A. Vedaldi et al. (Eds): ECCV 2020, LNCS 12350, pp. 108-124, 2020.
M. Garland et al., Fast Polygonal Approximation of Terrains and Height Fields, School of Computer Science, Carnegie Mellon University, Pittsburgh, PA, Sep. 19, 1995.
H. Gohari et al., An efficient methodology for slicing NURBS surfaces using multi-step methods, Springer Verlag London Ltd. Published online: Dec. 7, 2017.
H. Hoppe et al., Mesh Optimization, Association for Computing Machinery, 1993.
H. Hoppe et al., Surface Reconstruction from Unorganized Points, University of Washington, Seattle, WA, 1992.
A. Jacobsen et al., Robust Inside-Outside Segmentation using Generalized Winding Numbers, ETH Zurich and University of Pennsylvania, 2013.
T. Ju, Robust Repair of Polygonal Models, ACM, Inc., New York, NY, 2004.
M. Kazhdan et al., Poisson Surface Reconstruction, Eurographics Symposium on Geometry Processing, 2006.
M. Kazhdan et al., Screened Poisson Surface Reconstruction, ACM Transactions on Graphics, 2013.
R. Kolluri, Provably Good Moving Least Squares, Department of Computer Science, University of California, Berkeley, Berkeley, CA, Aug. 2005.
B. Krayer et al., Generating signed distance fields on the GPU with ray maps, Springer-Verlag GmbH Germany, part of Springer Nature 2019, Published May 7, 2019.
J. Martinez et al., Chained segment offsetting for ray-based solid representations, Computers and Graphics, Elesevier, 2015, 46 (1), pp. 36-47.
F.S. Nooruddin et al., Simplification and Repair of Polygonal Models Using Volumetric Techniques, IEEE Transactions on Visualization and Computer Graphics, vol. 9, No. 2, Apr.-Jun. 2003.
A.C. Oztireli et al., Feature Preserving Point Set Surfaces based on Non-Linear Kernel Regression, Eurographics Association and Blackwell Publishing Ltd., Oxford, UK and Malden, MA, USA, vol. 28, No. 2, 2009.
J. Podolak et al., Atomic Volumes for Mesh Completion, Eurographics Symposium on Geometry Processing, The Eurographics Association, Princeton, NJ, 2005.
R. Sawhney et al., Monte Carlo Geometry Processing: A Grid-Free Approach to PDE-Based Methods on Volumetric Domains, ACM Trans. Graph., vol. 39, No. 4, Article 123. Published Jul. 2020.
M. Schwarz et al., Fast Parallel Surface and Solid Voxelization on GPUs, Max-Planck-Institut Informatik, Published 2010.
V. Sitzmann et al., Implicit Neural Representations with Periodic Activation Functions, Sanford University, Preprint, Jun. 17, 2020.
L. Szirmay-Kalos et al., Displacement Mapping on the GPU—State of the Art, vol. 25, No. 3, pp. 1-24, 2006.
K. Vidimce et al., OpenFab: A Programmable Pipeline for Multi-Material Fabrication, Massachusetts Institute of Technology, 2013.
A. Vlachos et al., Curved PN Triangles, ATI Research, Microsoft Corp., Univ. of Florida, 2001.
H. Xu et al., Signed Distance Fields for Polygon Soup Meshes, University of Southern California, 2014.
S. Yamakawa et al., Removing Self Intersections of a Triangular Mesh by Edge Swapping, Edge Hammering, and Face Lifting, The Dept of Mechanical Engineering, Carnegie Mellon University, 2009.

* cited by examiner

ADDITIVE MANUFACTURING CONTROL BASED ON DISPLACED SIGNED DISTANCE FIELDS

CROSS-REFERENCE TO RELATED APPLICATIONS

This application claims priority to German Application No. 10 2020 215 766.9 filed Dec. 11, 2020, the entire disclosure of which is incorporated by reference.

FIELD

The present invention relates to additive manufacturing and more particularly to controlling additive manufacturing devices and processes using displaced signed distance fields of voxels.

BACKGROUND

In additive manufacturing, an object is typically produced by locally depositing and/or locally solidifying material that is often provided in initially shapeless (e.g. liquid or powdery) form. Additive manufacturing may also be referred to as 3D printing. Generating locally solidified material may also be referred to as printing the material at a specific location.

Additive manufacturing devices have a building space (or building box) in which they produce the object by successively printing object layers or slices. The successive slices or layers are stacked on top of and are connected to one another. A smallest possible volume of printable (i.e. locally solidified) material typically resembles a voxel of the building space. More precisely, a voxel may be defined as a convex, typically cuboid volume, which constitutes the smallest addressable volume of the printing device. In a generally known manner, the building space is preferably discretized as or in form of a regular three-dimensional grid or matrix of voxels that are distributed (e.g. stacked) along each axis of a three-dimensional Cartesian reference coordinate system. The number of voxels per unit volume determines a resolution of the 3D printer which increases as voxels become smaller. The voxel size is subject to the technical capabilities of each 3D printer.

A basic challenge for printing objects is to select those voxels, which accurately approximate a desired shape of an object. The 3D printer is controlled to provide solidified material only in or at the selected voxels.

For performing the selection, a description of the three-dimensional shape of the object is initially needed, commonly a description of the object's surface. This description typically represents an approximation of a true surface (i.e. original or master surface) of an original or master object that is to be printed and/or that is to be replicated by printing.

The process of transforming the description/approximation into a selection of voxels for 3D printing may also be referred to as voxelization. A voxelization may be considered successful when a certain level of accuracy with regard to reflecting the object's shape is achieved and/or when a physically realizable (i.e. printable) shape is defined by the voxels. The latter may be equivalent to the voxels defining a manifold surface enclosing a finite volume.

SUMMARY

Whether the voxelization is successful largely depends on the quality of the approximation of the object's shape. In other words, it largely depends on the quality of the input data.

Typically, this approximation may be provided in form of a point cloud or a mesh consisting of two-dimensional geometric elements, such as triangles. Mesh elements may be linear elements, which are flat, or higher-order elements, which are curved. The order may in this context refer to a polynomial order and a higher order may be any order above linear (e.g. quadratic or cubic, but typically not higher). The description can e.g. be derived from a 3D scanning process of an original object or master object that is to be replicated by 3D printing. It may also be derived from virtual three-dimensional models (e.g. CAD models) that are meshed as is known from standard FEM-algorithms (finite element method).

The voxelization is typically performed by determining intersections and spatial overlaps between the primitives of the approximation (e.g. its points or polygons) and the voxels, e.g. when (virtually) transforming the approximation into the reference coordinate system of the building space. The transformation may include any of scaling, rotating and translating of the primitives and their coordinates.

Often, however, the approximation is marked by a number of imperfections (e.g. holes), leading to an incomplete description of the object's surface. Point primitives, as in the elements making up a point cloud, are inherently an incomplete approximation of the true surface, as they represent just a sampling of the surface, without specifying connectivity information that would complete the surface. The capability of a voxelization algorithm to deal with such issues may determine its robustness. While numerous approaches exist for improving the voxelization robustness, these are often directed at very specific types of imperfections and require lots of computer memory and processing time. For example, these approaches are often marked by locally refining a tessellation to mask and/or replace an imperfection, e.g. by a respective local re-meshing. This increases memory footprint and requires processing time. An example can be found in: S. Bischoff, D. Pavic, L. Kobbelt, Automatic restoration of polygonal models, ACM TOG 21, 4 (2005), the entire disclosure of which is incorporated by reference.

Likewise, geometric features defined by or contained in the approximation may at least locally be smaller than the voxel resolution at hand. In this case, it may be difficult to determine whether a voxel is (predominantly) on an exterior or interior of an object, wherein an incorrect determination significantly diminishes printing accuracy.

A further issue arises when scaling objects within the building space. In order to maintain a desired level accuracy, it is often necessary to change a local tessellation of the object's approximation (e.g. of a polygonal mesh), for example when approximating a curved surface. This applies in particular when increasing the object's size. Adjusting the tessellation, however, increases memory footprint and requires significant processing time.

It is therefore an object of this disclosure to provide a voxelization procedure, in particular a method for selecting voxels to produce an object, and a computer device for manufacturing an object that limit at least some of the above drawbacks. A further object is to provide a computer program product to provide the voxelization and a system for producing an object.

This object is solved by the subject-matters of the attached independent claims. Advantageous embodiments are defined in the dependent claims. Any of the above explanations and/or definitions may equally apply to the presently disclosed solution, if not stated or evident otherwise.

In general, the present disclosure suggests a novel voxelization approach. More precisely, voxels are selected based on signed distance values of the voxels, the distance preferably referring to a voxel-based (pre-) approximation of the surface. Further, displacement information reflecting a displacement between the approximated surface and true surface are preferably included as well. In sum, this may generally be referred to as computing a displaced signed distance e.g. with respect to the true surface. When this is done for a number or even each voxel of the building space (both being presently possible), a displaced signed distance field may be determined which comprises the (displaced) signed distance values of the voxels.

Instead of only directly converting the object's approximation into voxels (e.g. by determining spatial overlaps in a common coordinate system) and using this as a final voxelization result as is often done in the prior art, the displaced signed displaced field of this disclosure may be used to perform robust and accurate voxel selections at low computational costs, in particular when scaling printing sizes. For doing so, a (initial) voxel-based approximation may be generated or received a may be used to compute the displaced signed distance field.

The determination of the displaced signed distance field provides a number of advantages and helps to overcome existing drawbacks as noted above. For example, the present solution enables directly relating voxels at the manufacturing device's resolution to the approximation of the (true) object. The selected voxels may thus represent an accurate voxel-precise representation of the true surface that can be used for controlling the additive manufacturing device with limited or no further transformation of the representation.

Further, with the disclosed voxelization approach it is possible to use approximations combining a rough basic approximation (e.g. a sparse point cloud or coarsely tessellated polygonal mesh or a sparse voxel-based approximation after a pre-process) along with a displacement map. This is a generally known approach for describing three-dimensional surfaces at low computational, storage and transmission costs, which so far has not been made sufficient use of in the context of voxelization, in particular not without an intermediate step refining the tessellation to a point where it is made up of polygons on the order of the size of a voxel. Specifically, the displacement map may define a topographic texture or height map of the actual outer surface that is approximated with reference to (or starting from) the basic (rough) approximation. Presently, this displacement map can directly be used to select voxels that accurately resemble the approximated surface at limited computational efforts.

Note that the possibility of using a coarsely tessellated polygonal mesh and/or sparse voxel-based approximation, while still being able to print accurate and smooth surfaces due to including the displacement maps, may simplify the initial approximation procedure, e.g. compared to using highly detailed polygon meshes from the start.

In addition, when scaling an object and/or its approximation for printing, the present voxelization approach does not necessarily require refining a tessellation or performing other comprehensive adjustments of the approximation to achieve a desired accuracy. Often, displacement maps are derivable at a sufficient level of detail to be applicable for a bandwidth of object scales. This is in particular valid in case the displacement values of the map are defined relative to an underlying basic approximation and/or are scalable themselves, i.e. are not necessarily absolute displacements. In general, it has been found that determining displaced signed distance fields upon scaling usually requires less computational resources than adjusting or redefining tessellation geometries for directly (i.e. without any displacement maps involved) approximating a scaled object.

Further, a displaced signed distance field notation helps to improve robustness. For example, it has been found that in order to compensate for incomplete approximations a function (sign function) determining a sign of the signed distanced value can be regularized or smoothed. The function may output values of a defined continuous range, e.g. between a negative and positive bound (for example −1 and +1), wherein positive and negative indicate positions on the interior and exterior of the approximated surface, respectively. At discontinuities or holes within the surface approximation data, the sign function may experience similar discontinuities or sudden changes. Thus, by regularizing or smoothing its values, such sudden changes can be smoothened and the effect of discontinuities on printing accuracy can be lowered. This helps to create a more plausible surface in regions where the approximation is missing data.

The regularization may be performed by filtering values of the sign function for voxels in a defined neighborhood of a voxel at which the discontinuity occurs. For example, a box filter or Gaussian filter may be used. Preferably, the extent (size) of the neighborhood is determined based on the distance of the voxel to the nearest surface and/or point and/or voxel of the approximation, so as to maximize the amount of smoothing while not combining sign information from opposite sides of a part of the approximation surface. Alternate types of regularization include enforcing the sign function to satisfy partial differential equations (PDEs), for example a diffusion process, or the Laplace or Poisson equations. Regularization based on PDEs may be computationally more costly than filtering.

Filtering the sign function improves robustness at limited computational costs. In particular, compensating for discontinuities may require only limited and/or at most linearly increasing processing times at increasing voxel numbers. This is different from known surface repair approaches that use local re-meshing to replace or bridge discontinuities and do not use a displaced signed distance field notation at all.

Still further, the present solution provides efficient ways to accurately determine displacement information and/or displacement maps e.g. when receiving a primitive base-approximation. This is valid in particular for curved (i.e. higher-order) primitives or curved polygons, such as curved triangles. Specifically, a way to transform surface approximations based on such curved elements into a more compact notation based on a displaced signed field is disclosed herein, the notation being accompanied with any of the above advantages.

According to one aspect, a method for selecting voxels to produce an object (e.g. a workpiece) with an additive manufacturing device, in particular with a 3D printer, is suggested, the additive manufacturing device having a building space that is discretized (differently put, subdivided) into virtual voxels, the method comprising:

optionally: receiving surface approximation data that approximate a (e.g. true, original or reference) surface of a three-dimensional object e.g. in form of a primitive based approximation;

receiving (preferably generating) a voxel-based approximation of the (e.g. true, original or reference) surface of a three-dimensional object, preferably based on the surface approximation data;

determining, for each of at least a subset of the voxels, a signed distance value describing a distance between each voxel and at least one point defined by the voxel-based approximation (e.g. the point of the surface approximation data nearest to the voxel);

selecting voxels at which material should be added (e.g. printed or solidified) to produce the object, the selection being performed based on the signed distance values of the voxels;

wherein the signed distance value of each voxel is further determined based on a displacement value describing a topographic (or height) characteristic of the surface approximation (data), e.g. by describing a displacement between the object's surface and its approximation by the surface approximation data, in particular at or near a point of the voxel-based approximation that is closest to the voxel.

Accordingly, the signed distance value may also be referred to as displaced signed distance value. The term "signed" indicates that preferably positive and negative distance values can be determined and that the signed distance value is marked by a respective sign.

Further described is a method to generate control signals, i.e. manufacturing data, for the additive manufacturing device, wherein control signals are generated based on the selected voxels. Controls signals can e.g. encode information at which voxel of the building space a printing material should be applied, wherein the building space denotes the space comprising all voxels at which printing material can be applied by the additive manufacturing device. A voxel can represent a volume unit of the building space. Further described is a method for producing an object with an additive manufacturing device, wherein the additive manufacturing device is controlled such that one or more printing material(s) are applied to the selected voxels. It is possible that information on the selected voxels are transmitted to the additive manufacturing device, wherein a control unit of the additive manufacturing device determines control signals for one or more print head(s) of the additive manufacturing device. It is, however, also possible that the control signals are transmitted to the additive manufacturing device which then performs the printing based on the control signals. Printing can involve the movement of one or more print head(s) and/or the application of one or more printing material(s) to a volume unit in the building space.

The 3D printing process can e.g. be an extrusion-based process, a wire-based process, a granular-based process, a power-bed process or a lamination-based process. Preferably, the 3D printing process comprises a material jetting process with a subsequent polymerization. In such processes, one or more liquid printing materials, e.g. liquid photo polymers, are applied into or onto a layer and exposed to radiation, e.g. to a laser beam, in order to harden to exposed printing material. For example, printing materials can be provided by printing inks, wherein the printing inks can be hardened or cured after the application on to or into a layer, e.g. by exposure to light, in particular to UV radiation. The printing inks can have different colors and/or degrees of translucency. The process can also be referred to as polyjetting which is also known as multi-jet modelling.

The printing process can comprise the generation of successive slices, i.e. layers, which are oriented perpendicular to a vertical axis (z-axis). Such a slice can also be referred to as z-slice. The z-slices can be oriented parallel to a plane spanned by a longitudinal axis (x-axis) and lateral axis (y-axis). Such a slice can also be referred to as x, y-slice. The mentioned axes can provide axes of a reference coordinate system, in particular of a printing space or build space coordinate system. A z-slice therefore denotes a two-dimensional cross section of the printing object, e.g. with predetermined thickness, wherein the section plane is perpendicular to the aforementioned vertical direction.

Before performing the method, e.g. in a modelling step, a model of the 3D printing object can be created, e.g. by computer added design (CAD). The modelling step can be part of the claimed method. Such a model can also be generated by 3D-scanning, in particular by capturing shape, color and translucency information of an object which is to be reproduced by printing. The model can encode reproduction information, wherein a reproduction information can denote or comprise a shape information, color information and/or translucency information. These pieces of information provide a specification of what shape, color and/or translucency perception from the printing object a user wishes to have. In other words, the information encodes set values for the shape, color and/or translucency of the printing object.

The modelling step can be performed independent of the 3D printing device which is to be used. By the modelling step, input data for the proposed method can be generated. The input data can encode the aforementioned surface approximation data: in particular, shape information as texture information or vertex information. Encoding shape information as both vertex and texture information advantageously allows for a more compact shape information. In particular, splitting the shape information into a coarse, or macroscopic, shape information stored in or encoded by the vertex information, and a fine, or mesoscopic, shape information stored in or encoded by the texture information allows for a very compact shape information resulting in reduced storage space requirements and data transmission costs for surfaces with much fine scale topography. Preferably, the mesoscopic shape information stored as or encoded by texture information is a two-dimensional height map where each pixel represents the positive or negative distance of the true surface (set surface) relative to the macroscopic shape information stored as or encoded by the vertex information, along the surface normal at the corresponding position/point on the macroscopic shape. In this case, a pixel value representing the distance can be assigned to each sampling point of the surface in the macroscopic shape information. Other types of texture information can be used to represent and store mesoscopic shape information, for example three-dimensional offsets relative to the macroscopic shape information. In another example, vertex information can be augmented with additional vertex attributes, such as normal vectors, or with additional vertex information in the form of control points, to specify a curved, rather than flat, surface between the sampling points of the true surface of the macroscopic shape which are encoded by the vertex information.

Such additional vertex information can specify curved surfaces as triangular Bézier patches, rectangular Bézier patches, Lagrange elements, or Non-Uniform Rational B-Spline (NURBS) patches. This advantageously allows the representation of smoothly curved surfaces with less vertex information than when the vertex information comprises flat elements or patches. Further, color and translucency information can be encoded by a RGBA signal on the object's surface, for example in form of a RGBA texture or per-vertex RGBA attributes. An RGBA signal can e.g. be provided by a RGBA vector, wherein entries of the "RGB" portion encode a color information and the entry of the "A" portion encodes a translucency information. Thus, a desired color and translucency can be assigned to the printing object or parts thereof. The input data can be generated independent of a 3D printing device. Examples for a possible data format of input data is the so-called .obj data format, the .wrl data format or the .3mf data format whereas the color and translucency is embedded in such formats as a RGBA texture file encoded e.g. in a PNG data format or a TIFF data format. For example, the .3mf data format is created to store textured 3D models for 3D printing by an industrial consortium. Preferably, the reproduction information can be provided by a texture image, wherein every point or selected points on a 3D surface representation of the printing object has assigned coordinates in the domain of a texture image. Based on the the input data, the voxel-based approximation of the (e.g. true, original or reference) surface of a three-dimensional object can be determined. Also, the input data allows to determine the displacement value.

According to a further aspect, a computer device for generating manufacturing data (e.g. printing data) for an additive manufacturing device, in particular a 3D printer, the additive manufacturing device having a building space that is discretized into virtual voxels, the computer device being configured to:
  optionally: receive surface approximation data that approximate a surface of a three-dimensional object;
  receive (preferably generate) a voxel-based approximation of the (e.g. true, original or reference) surface of a three-dimensional object, preferably based on the surface approximation data;
  determine, for each of at least a subset of the voxels, a signed distance value describing a distance between each voxel and at least one point defined by the voxel-based approximation;
  generate manufacturing data by selecting voxels at which material should be printed to produce the object, the selection being performed based on the signed distance values of the voxels;
  output the manufacturing data to the 3D printer;
  wherein the signed distance value of each voxel is further determined based on a displacement value describing a topographic characteristic of the voxel-based approximation.

The computer device can have at least one interface to transmit the manufacturing data to the 3D printer. The manufacturing data can provide the aforementioned control data for the 3D printer. The computer device can have a further interface for receiving input data generated in a modelling step.

The following embodiments, features and discussion equally relate to the method and computer device. In particular, the computer device may be configured to carry out a method according to any of the embodiments disclosed herein and may comprise any further features needed for doing so. This may be reflected herein by referring to a presently disclosed solution, the solution covering both of the method and computer device.

The surface approximation data may be generated as a part of the present solution (e.g. as a dedicated method step and/or by the computer device). They may e.g. be provided in form of a point cloud or polygonal mesh (with the polygons e.g. being flat or curved triangles). The surface approximation data may contain a displacement map comprising the displacement values.

The surface approximation data may be used to, in a voxelization pre-process, generate the voxel-based approximation. This may be an initial or rough approximation that is refined by performing the disclosed selection. Thus, a final voxel-based approximation may be arrived at that is used for generating the manufacturing data.

For determining the signed distance value including the displacement information, a displacement value of a point (e.g. a voxel center) included by the voxel-based approximation may be selected that is closet to a voxel (in particular to its center) for which the signed distance value is to be determined. The displacement value may be subtracted from the signed distance between the voxel and e.g. a closest point thereto of the voxel-based approximation.

In one example, the surface approximation data include or define a basic approximation, e.g. based on a coarse tessellation previously discussed. Additionally, displacement values may be included in or may derivable from the surface approximation data. Preferably, the voxel-based (surface) approximation is as such sparse or basic and e.g. associated with displacement values that are provided or determined according to any example disclosed herein. The distance of a voxel may be determined with respect this basic (voxel-based) approximation and a displacement value may be additionally considered for determining a final (displaced) signed distance value.

Computation of the displacement values may be part of the present solution. In case of a point cloud, for example, local surface patches may be computed based on coordinates of points in a defined neighborhood. Such a neighborhood may be defined by a fixed number of points from the point cloud, which constitute the nearest points to the point in question, or the neighborhood may be defined by all other points from the point cloud within a fixed distance to the point in question, or it may be a combination of these. A displacement value of a point in the neighborhood may be computed as a distance between the point and surface patch along a normal vector of the surface patch, or along the normal vector associated with the point, if provided. Especially for point clouds (but not limited thereto), an assumption on inherent noise may be used to compute a displacement. The noise may e.g. be caused by a sensor used for capturing the point cloud. A voxel comprising a respective point (e.g. a voxel of the voxel-based approximation) may be assigned the point's displacement value.

For two-dimensional polygons, such as flat triangles, the displacement value may be determined based on a distance between a voxel center (e.g. of the voxel-based approximation) to its nearest polygon or, more specifically, to the nearest point on a polygon intersecting the voxel. This represents an approximation in that the polygons are considered to represent the true surface for the purpose of determining a displacement. Note that this may be different from determining distances as disclosed herein, as such distances may e.g. be determined between a voxel (in particular its center) and a nearest (surface) voxel (in particular its center) that represents the approximated surface.

In sum, distances (in particular in the context of distance values or distance fields) may relate to inter-voxel distances, whereas displacements may relate to a distance between a voxel representing the approximated surface (i.e. being part of the voxel-based approximation) to a nearest point on the true surface, the latter e.g. being equated with the primitive-based approximation of the object.

A general procedure for computing displacement values may likewise be summarized and/or implemented as follows: The displacement value preferably encodes the distance from the voxel center to the true surface (or a suitable model or approximation thereof) along the direction of the normal vector e.g. given by the basic (low-order/flat) primitive(s) intersecting that voxel. The true surface may be defined in particular by any of the following:

(a) The flat polygon(s) intersecting the voxel;
(b) The higher-order (curved) polygon(s), whose flat version(s) (e.g. the equivalents discussed herein) intersect the voxel;
(c) A precomputed local approximation for point primitives, based on other nearby points, reflecting an estimate of noise in a sensor-based acquisition process;
(d) The result of (a) or (b), but in particular (a), modified in that a value is sampled from a displacement image and multiplied by the normal vector of the basic primitive, where a displacement image is, according to known conventions, a grey-scale image representing a height map or topographic image, relative to the approximate surface defined by the primitives, and is provided as input with the point cloud or polygon mesh approximation;
(e) The result of (a) or (b), but in particular (a), modified in that a displacement along the normal vector of the basic primitive is defined by a mathematical function based on the available quantities, such as voxel position, randomly generated values, or additionally supplied parameters specifying how to combine these values. This may be described as generating displacement patterns as a function of local surface information in order to match these to particular types of surface appearances.

For higher-order, e.g. curved, polygons, such as curved triangles, a displacement may be computed as follows: A linear polygon may be defined by connecting the vertices of the curved polygon with straights edges. The resulting polygon may represent a flat equivalent of the curved one. Following that, the displacement may be determined as a distance between this equivalent and the curved polygon, preferably along a normal vector of the equivalent, which may be computed by determining the point of intersection between the curved polygon and a line starting at a point on the flat polygon and extending in the direction of the normal vector. A voxel containing or being intersected by the flat equivalent may be assigned the displacement values computed for that equivalent (see also b) above). A signed distance value may be determined based on a distance between voxels to the voxel-based approximation as well as based on the computed displacements assigned to the voxel-based approximation.

To sum up, for higher order primitives, an initially received surface approximation may be transformed into a notation based on flat equivalents forming a basic approximation and displacement values discussed above (i.e. by computing a displaced signed distance field).

Any of the data, values and properties discussed herein may refer to and/or be defined in a defined (e.g. reference or global) coordinate system. The coordinate system may be defined with respect to the building space and the discretization of the voxels may be defined with respect to the coordinate system as well. In a generally known manner, the approximation and/or the object (e.g. a virtual model thereof) may be (virtually) arranged in the building space according to predetermined rules and/or based on manual input. Accordingly, coordinates of the approximation can be defined with respect to the reference coordinate system, i.e. the surface approximation data may be centered or defined in the reference coordinate system as well.

The surface approximation data may generally define a point by directly including it and/or its coordinates. They may also indirectly define it, e.g. by including other information or coordinates from which the point's coordinate may be computed (e.g. a center point of a polygon whose coordinates can be computed based on stored coordinates of the polygon's vertices).

A voxel may generally be represented by the coordinates of its center point. Any distance or other spatial characteristics of a voxel discussed herein may be defined and/or computed with respect to the center. Generally, a voxel may confine a space surrounding its center point and preferably a cubic space.

Preferably, the at least one point of the voxel-based approximation to which the distance is determined is the point nearest to a voxel (for which the signed distance is to be computed).

The selection of voxels may be equivalent to and/or result in generating a data set (in particular a set of manufacturing data) comprising or defining the voxels at which material should be added (e.g. printed or solidified). This data set may form the basis of controlling the additive manufacturing device, e.g. by defining coordinates based on which moving and/or printing control instructions are generated.

Accordingly, the present solution may further comprise generating control signals (or, differently put, control instructions) for making the additive manufacturing device print material at the selected voxels. Then, the device can be operated according to/with the control signals in order to produce/print an object.

Generally, the voxelization procedure (i.e. voxel selection) may be carried out as an initial step of manufacturing data preparation. In one example, the computer device disclosed herein is configured or designed separately and/or independently of the additive manufacturing device and e.g. connected thereto by a wire-bound or wireless communication path. For example, the computer device may be a stand-alone personal computer. It may transfer the generated manufacturing data to the additive manufacturing device and in particular to a control unit thereof. The control unit may use the data to generate control instructions for the manufacturing device. It is, however, equally possible to integrate the presently disclosed computer device into the manufacturing device and/or that the computer device is comprised by a control unit of the manufacturing device. The control unit can be provided by at least one microcontroller or at least one integrated circuit and can be configured to perform the determination of the signed distance value, in particular for each of at least a subset of the voxels, and/or the selection of voxels at which material should be added to produce the object and/or the generation of control or manufacturing data.

In a generally preferred manner, the voxelization procedure and/or generation of manufacturing data may at least temporarily overlap or, differently put, be carried out simultaneously with printing the object. For example, the build space may be subdivided into virtual slices. These may be stacked along a defined axis of e.g. the reference coordinate system, in particular a vertical or z-axis. The slices may extend in a plane that extends orthogonally to the vertical or z-axis (e.g. an x-y-plane). Each slice may comprise a defined length unit and in particular one voxel along the z-axis. The approximation of the true surface and/or the selected voxels may equally be defined with respect to such slices.

In one example, the manufacturing data are generated for each slice or for a defined chunk of slices. For example, for a defined number of slices (the number being at least one) any of the steps disclosed herein may be performed and the generated manufacturing data may be transferred to the additive manufacturing device which, preferably, starts manufacturing of the product right away. Following that, a subsequent number of slices (e.g. subsequent along the z-axis) may be processed to generate associated manufacturing data for building up the object slice-by-slice. This way, data preparation and manufacturing can be coordinated and in particular time-interleaved to save time. This may also be referred to as streaming the manufacturing data to the additive manufacturing device. The present solution enables this streaming, i.e. provides a streaming framework, as any of its disclosed features and measures may be applied to single slices or chunks of slices without having to refer to and/or initially process a complete object approximation as a whole Such a streaming advantageously requires only the storage of the manufacturing data with respect to the defined number of slices at any given time which reduces the memory space requirements.

Further, the processing time for the proposed selection of voxels for producing an object can be reduced and/or a computational load for the proposed selection can be distributed onto multiple processing units by a parallelization, wherein multiple processing units can perform steps or sub steps of the proposed method simultaneously. It is e.g. possible to perform the determination of the signed distance value for a selected voxel by determining a sign value and an unsigned distance information simultaneously, e.g. by independent processing units. It is further possible to perform the determination of the signed distance value for a selected voxel and the displacement value for the voxel simultaneously. It is further possible to perform the determination of the signed distance value and/or the displacement value for each voxel of a set of at least two different voxels simultaneously. This advantageously allows to provide a very fast selection of voxels for producing an object and/or to perform the method with multiple processing units each featuring a low computational capacities.

Further, the proposed method allows an efficient memory management. It is e.g. possible to store the unsigned distance value in a first storage space assigned to a selected voxel and to store the sign value in a further storage space assigned to the selected voxel. The signed distance value can then be determined by multiplying the unsigned distance value and the sign value and can be stored in the first or, preferably, the further storage space assigned to the selected voxel. This reduces the required memory space and allows to provide a selection of voxels for producing an object with low storage space requirements.

The displacement values may define a displacement along a defined axis and in particular along a normal of the (approximated) surface defined by the voxel-based approximation. Accordingly, they may define a height or distance along the surface normal from the surface defined by the voxel-based approximation and in particular by its tessellation geometry, the latter e.g. resembling a previously discussed basic approximation.

In one example, the displacement value is derived from a displacement map e.g. derivable from or comprised by the surface approximation data. In a generally known manner, displacement maps define a topographic texture and/or height map with respect to an underlying or basic surface approximation, such as a basic tessellation geometry of an approximation. Points defined by the tessellation geometry may be (virtually) shifted and/or displaced according to values of the displacement map (in particular along the surface normal) to add a topographic texture to the approximated surface. In this context, the term "map" indicates that respective displacement values are stored and thus mapped for a number of points defined by the basic surface approximation.

This way of describing a topographic texture or height profile also allows for modelling curvatures of the surface without the surface and/or its underlying basic surface approximation being curved to a similar degree. This result is a more compact surface approximation saving significant memory space.

As has been shown above, the displacement value may also be derived from the voxel-based approximation and its displacements with respect to a primitive-based approximation. These displacements may as well be stored in a displacement map and/or may be computed e.g. as part of a voxelization pre-process.

Generally, it has been found that using a displacement map is computationally often more efficient (e.g. with respect to required storage as well as extent of data transmission and processing) than using refined tessellations sample and approximate a topographic texture. As previously noted, with respect additive manufacturing, this allows for more efficient data processing when scaling an object to be printed.

For example, when enlarging an object while trying to maintain a defined accuracy (that is e.g. defined as a tolerance level), an approximation of the object's shape based on tessellation has to be significantly refined. In fact, the tessellation may have to be refined in a non-linear manner at increasing sizes and may e.g. easily quadruple. This increases the data amount to be processed and stored. To the contrary, by making use of a displacement map, a respective data increase is typically less comprehensive, thus e.g. allowing for faster streaming of manufacturing data.

According to a further embodiment, those voxels may be selected whose signed distance value indicates the voxel being located on or inside the object (e.g. the true surface or any models or simplified replacements thereof, see a) to e) above). Typically, a voxel that is inside the object's surface has a negative sign and when it is on the surface it may have a value of zero.

Further, those voxels may be selected which, as an additional requirement, have at least one neighboring voxel whose signed distance value indicates the voxel being located outside of the object (in particular as approximated by the primitive-based approximation). This may be the case when the value is larger than zero, i.e. has a positive sign). Voxels may be considered neighbors when they are part of a defined neighborhood. The neighborhood may define a preferably cubic volume, e.g. having a defined voxel at its center, and the voxels contained in the volume may be neighbors to the defined voxel. The neighborhood may be limited to only direct neighbors that e.g. have adjoining faces with a defined (e.g. center) voxel. This may be referred to as a 6-neighborhood. Alternatively, e.g. 26-neighborhoods may be used which contain voxels sharing a corner with a center voxel. More backgrounds on neighborhood definitions in the context of voxelization may be found in: D. Cohen-Or and A. Kaufman, Fundamentals of Surface Voxelization, Graphical Models and Image Processing 57, 6 (November 1995), 453-461, the entire disclosure of which is incorporated by reference.

Note that considerations referring to an interior (inside) or exterior (outside) may be based on a respective definition of an inside and outside of the surface. Preferably, the surface defines a closed manifold of a three-dimensional shape, e.g. as a result of the voxel selection criteria disclosed herein, for which an interior or exterior are unambiguously determined.

This does not exclude that the respective shape has imperfections as discussed herein. In more formal terms, the interior of a closed surface may be defined to be the subset of the Euclidean domain with a finite volume. Any closed, compact, orientable 2-manifold surface divides a three-dimensional space into disjoint regions, one with finite volume (interior) and the other with infinite volume (exterior).

As mentioned above, a further embodiment includes at least locally (e.g. with respect to a defined neighborhood) filtering a sign function that determines the sign of the signed distance value. The filtering may provide a smoothening or averaging effect, e.g. by adjusting a local values of the sign function to neighboring values or, generally speaking, harmonizing these values.

In general, the sign function may be applied to each voxel. Differently put, each voxel may be assigned a value computed by the sign function, the value representing a local value of the sign function. The filtering may be applied to voxels whose sign function values represent outliers e.g. compared to a defined neighborhood.

Note that the filtering may be performed by taking a value of the signed distance field (describing a distance to the voxel-based approximation) at the voxel to be filtered into account. Specifically, an extent or parameters of the filtering may be adjusted based on this value. In the case of a box filter or average filter, the distance of the voxel whose sign value is to be filtered to the voxel-based approximation may be used to determine the width of the box filter. In particular, the box filter may average a number N_f of voxels on either side of the voxel whose sign value is to be filtered, such that N_f is the maximum integer value that when multiplied by the size of a voxel is less than the distance of the voxel to the voxel-based approximation. Note that one-dimensional box filters can be applied using this approach successively along each axis, with the result of filtering along one axis being the input for filtering along the next axis. Filtering can be applied along the axes in any order, for example along x, then y, then z.

Similarly, in the case of a Gaussian filter, the standard deviation of the Gaussian weighting function may be set to a fraction of the distance of the voxel to the voxel-based approximation, for example one half or one third of this distance.

According to one aspect, a sign for at least one voxel that contains a plurality of primitives used for approximating the surface is determined based on an orientation of at least one face of the voxel relative to the primitive. The primitives may be part of the surface approximation data, i.e. of the approximated surface (or surface approximation) defined by these data or primitives. The voxel may contain the primitive as a whole and/or may contain or be at least intersected by a plurality of such primitives. As noted above, this may be the case when approximating the object's surface at sub-voxel accuracy with a respectively detailed primitive-based approximated surface.

Sign determination for a respective voxel preferably includes a determination of whether the voxel is located predominantly inside or outside of the primitive(s) (and/or the surface region to which the primitive(s) belong(s)). An interior or exterior of a primitive may be defined by a direction of a normal vector. In case of polygon primitives, the latter may e.g. be derivable from a standardized vertex indexation. In case of point clouds, each point may be associated with a respective normal vector in accordance with a direction of a sensor axis when capturing the point.

In one example, the orientation of a voxel face with respect to contained primitives is determined based on a gradient of a signed distance field of a primitive (i.e. for which the primitive and in particular a plane defined thereby acts as a reference and where distances of points in space relative thereto are determined). The gradient may be projected onto pre-defined directions, e.g. the six (positive and negative) directions defined by the reference coordinate system. Such a set of gradient projections may be performed for each primitive intersecting the voxel.

A sum of respective gradients may be determined for each primitive for each face. A distance of the primitives to preferably each face may be taken into account. For doing so, weighting may be used. Such a weighting may preferably be higher when the primitive is closer to a voxel face, and lower when the primitive is farther from a voxel face. To determine the distance of a primitive from a voxel face, the geometric centroid of the intersection of the primitive with the voxel (put differently, the centroid of the restriction or clipping of the primitive to the voxel) may be used.

As previously noted, a sign function that determines the sign of the signed distance value may at least locally be filtered, or otherwise regularized or smoothed, to improve robustness and enable printing of smooth surfaces even when receiving incomplete surface approximation.

Further, for compensating for self-intersection, differently put self-overlapping, portions of the voxel-based approximation a floodfill computation may be performed. This may e.g. be performed on a larger voxel neighborhood and/or for a number of slices of the build place prior to performing the voxel selection. This computation may determine whether voxels are located to empty areas of build space that e.g. do not contain the object. Afterwards, those selected voxels may be discarded that resemble a self-overlapping portion, e.g. since they are not adjacent to an empty region and thus do not lie on a surface. Further details on this are disclosed in connection with the below embodiment.

Further proposed is a computer program product with a computer program, wherein the computer program comprises software means for the execution of one, multiple or all steps of the method for selecting voxels to produce an object according to one of the embodiments described in this disclosure if the computer program is executed by or in a computer or an automation system. The computer program can further comprise software means for the execution of one, multiple or all steps of the method for generating control signals or the method for producing an object according to one of the embodiments described in this disclosure if the computer program is executed by or in a computer or an automation system.

Further described is a program which, when running on a computer, in particular the proposed computer device or system, or in any other suitable automation system, causes the computer or the (automation) system to perform one or more or all steps of the method for selecting voxels to produce an object, for generating control signals or for producing an object according to one of the embodiments described in this disclosure and/or to a program storage medium on which the program is stored (in particular in a non-transitory form) and/or to a computer comprising the program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

This means that the method or parts of the method in accordance with the invention is for example a computer implemented method. For example, all the steps or merely some of the steps (i.e. less than the total number of steps) of the method in accordance with the invention can be executed by a computer, in particular by the disclosed computer device or system. An embodiment of the computer implemented method is a use of the computer for performing a data processing method. The computer for example comprises at least one microcontroller or processor or integrated circuit and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right.

Steps executed or performed by a computer or an automation system can in particular be the determination of the signed distance value, in particular for each of at least a subset of the voxels, and/or the selection of voxels at which material should be added to produce the object and/or the generation of control or manufacturing data.

The computer program product advantageously allows to perform a method for three-dimensional printing according to one of the embodiments described in this disclosure for which technical advantages have been outlined before.

Further proposed is a (printing) system for producing an object comprising a computer device for generating manufacturing data according to one of the embodiments disclosed herein and an additive manufacturing device. The computer device and the additive manufacturing device can be provided by separate devices or by a common device.

The computer device and the additive manufacturing device can be connected by a wired or wireless data connection, wherein the manufacturing data generated by the computer device is transmitted to the additive manufacturing device via the data connection. The manufacturing device can have an interface to receive the manufacturing data. The additive manufacturing device can comprise at least one means for printing a printing material and at least one control unit. The system is configured to perform a method for selecting voxels, generating control data or producing an object according to one of the embodiments described in this disclosure.

Further described is a printing object, wherein the printing object is obtained or obtainable or directly obtained by a method for producing an object according to one of the embodiments disclosed in this disclosure. The printing objects obtained by the proposed method possess a surface with details in a higher resolution in comparison to printing objects obtained without the proposed step of determining the signed distance value of each voxel based on the displacement value describing a topographic characteristic of the voxel-based approximation.

Embodiments of the presently disclosed solution will be discussed in the following with reference to the attached schematic figures.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Embodiments of the presently disclosed solution will be discussed in the following with reference to the attached schematic figures.

DETAILED DESCRIPTION

Figure 1:
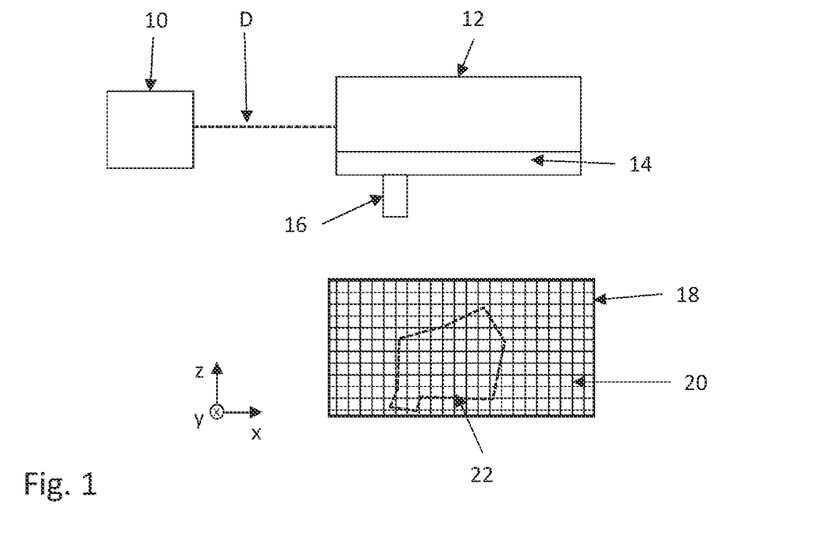
FIG. 1 is an illustration of a computer device according to an embodiment of this invention that generates manufacturing for a 3D printer.

FIG. 1 schematically depicts a computer device 10 e.g. in form of a PC. The computer device 10 is connected to an additive manufacturing device (in the form of a 3D printer 12) via, for example, a wireless communication path D. The 3D printer 12 may generally be configured according to known examples.

The 3D printer 12 has a kinematic unit 14 that comprises non-illustrated mechanical moving axes for moving a printing head 16 in and/or relative a build space 18. The build space is three-dimensional and associated with a Cartesian reference coordinate system 21, whose z-axis corresponds to a vertical spatial axis. Another axis (y) extends orthogonally to the plane of FIG. 1. This FIG. 1 thus resembles a side-view of the 3D printer 12.

The build space 18 is subdivided in a regular grid of voxels 20, only one of which is associated with a respective reference sign. Note that the illustration of FIG. 1 is merely schematic and the voxel size is preferably considerably smaller. Also, only full-sized voxels 20 are defined, even though the illustration might suggest otherwise near edges of the build space 18.

Further, an object 22 to be produced and as initially approximated by a primitive-based surface approximation is indicated by a dashed outline.

Figure 2:
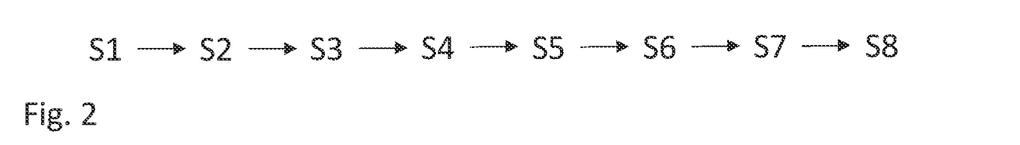
FIG. 2 is a flow diagram of a method according to an embodiment of this invention that is carried by a computer device according to an embodiment of this invention.

With reference to the flow diagram of FIG. 2, an operation of the system of FIG. 1 and in particular the generation of manufacturing data is discussed in the following.

In a first step S1, a first dataset comprising surface approximation data is received. The surface approximation data represent or contain a description of a three-dimensional object to be produced (i.e. printed). Specifically, the surface approximation data contains a description of three-dimensional characteristics of the object and in particular of its surface and shape. This description is a primitive-based approximation of the object's actual true surface and may (in particular mathematically and/or digitally) model the true surface based on generally known approaches.

For example, the primitive-based approximation may contain a point cloud that is e.g. generated based on a three-dimensional scanning of a sample of the object (e.g. of an original or master object). Alternatively, the primitive-based approximation may contain a mesh of at least two-dimensional and/or linear geometric elements and in particular polygons, such as triangles. In sum, the surface approximation data may contain primitives (preferably in form of the above points or polygons) approximating the object's surface.

The primitive-based approximation and specifically the coordinates of its primitives are defined in a coordinate system that is also referred to in subsequent steps. This coordinate system may act as a global or reference coordinate system and is, in the given embodiment, the coordinate system 21 of FIG. 2. Coordinates of the primitives may be transformed into the reference coordinate system 21 according to any known principle. For example, the three-dimensional shape described by the primitive-based approximation may be (virtually) arranged (e.g. translated or rotated) and/or scaled in a virtual representation of the build space 18 and thus with respect to the reference coordinate system 21.

As noted above, the build space 18 is subdivided into a number of regularly arranged voxels 20 (e.g. arranged as a regular three-dimensional grid or stack of voxels 20). A position of each voxel 20 is defined by coordinates (e.g. of its center point) in the reference coordinate system 21. The size of the voxels 20 is defined by a resolution of the 3D printer 12 and preferably resembles the smallest volumetric unit according to which the 3D printer 12 can locally print and/or deposit or produce solidified material.

In a step S2, a surface voxelization pre-process is used to, figuratively speaking, convert the three-dimensional primitive-based surface approximation into a three-dimensional surface approximation based on voxels 20. For doing so, the primitives of the primitive-based surface approximation data may be associated with spatially comparable and/or spatially overlapping voxels 20 and these voxels 20 may be selected to from a voxel-based approximation of the object 22. In a generally known manner, this voxel-based approximation may be used for printing the object 22, but is further refined herein by performing the below selection.

Specifically, in case of the primitive-based surface approximation comprising a point cloud, the surface voxelization pre-process includes identifying those voxels 20 containing (i.e. spatially overlapping with) the points of the point cloud. In this context, each point may be defined as infinitesimal and/or may not be contained in more than one voxel 20. In case of the points being associated with certain characteristics, such as color or material, the characteristic of a voxel 20 may be determined as an average of the characteristics of all the points contained by the voxel 20.

In case of the primitives being polygons, those voxels 20 may be identified which are intersected by a polygon.

As a result, a number of voxels 20 (surface voxels) is identified that approximate the three-dimensional surface described by the data of the surface approximation dataset (i.e. by initially received primitives). This may also be referred to as a voxel-based three-dimensional shape approximation $\tilde{\partial S}$, where $\tilde{\partial S}$ denotes the surface voxels 20 generated by the above surface voxelization pre-process which based on the input primitives. Preferably, only the voxels 20 identified during the surface voxelization pre-process are stored for further processing.

Note that in the given example, the focus generally lies on an accurate surface approximation and/or an accurate description of the object 22 for printing purposes. The interior of the object 22 is presently not of interest and any known approach may be used for determining to which degree structures should be printed therein (e.g. for supporting or stabilizing purposes).

Beginning with step S3 and based on the voxel-approximation of the object's surface, a displaced signed distance field is determined. In a generally known manner, determining a distance field means that for any point in a reference coordinate system (such as 21), the distance to a defined reference is determined. Presently, this reference is the voxel-based surface approximation $\tilde{\partial S}$ and the considered points u are the centers of any other voxel 20 of the build space 18. By adding a sign to the distance, it is defined on which side of the object (interior or exterior) a voxel 20 is positioned.

Note that a true surface of the object acting as a reference for the sign definition is implicitly defined by the below equation (3). The true surface comprises all voxels and/or points for which the equation (3) returns zero.

The determined distance to the surface approximation $\tilde{\partial S}$ is labelled $\tilde{d}(u)$. In the given case, the minimum distance is considered, i.e. the distance between each voxel center u to the nearest point v comprised the voxel-based surface approximation $\tilde{\partial S}$, where v is a center the nearest surface voxel. This can be expressed as follows (equation 1):

$$\tilde{d}(u) = \min_{v \in \tilde{\partial S}} \|u - v\|_2.$$

As indicated above, a present goal is to determine or at least approximate a signed distance value f(u) which additionally takes into account whether a voxel center u is located within the surface and thus the object (e.g. surrounded by its true surface ∂S) or outside thereof. This can be expressed as follows (equation 2):

$$f(u) = s(u)\tilde{d}(u),$$

with s: $\mathbb{R}^3 \mapsto [-1, 1]$.

Note that s(u) may be referred to as a sign function herein. It preferably has a continuous value range between its lower negative and upper positive bound, i.e. it is not restricted to the bounds. This is e.g. beneficial in the context of a surface repair by filtering as discussed below. Values different from the bounds may e.g. be arrived at when a voxel is displaced with respect to the surface, but at an angle to the nearest point on the voxel-based approximated surface $\tilde{\partial S}$, i.e. does not lie directly along the normal vector of the nearest point. If e.g. denoting that nearest point by $\bar{u}$, then s(u) is equal to the cosine of the angle between the vector u–$\bar{u}$ and the normal vector at $\bar{u}$.

The present embodiment also takes displacement information into account. In a generally known manner, these may be provided in from of a displacement map ϕ($\bar{u}$) with ϕ: $\tilde{\partial S} \mapsto \mathbb{R}$.

The displacement map ϕ($\bar{u}$) e.g. expresses deviations of the voxel-based approximated surface $\tilde{\partial S}$ compared to the true surface ∂S along the surface normal of the voxel-based approximated surface $\widetilde{\partial s}$. Generally, it describes a height profile or topographic texture of the voxel-based approximated surface $\widetilde{\partial s}$.

A point $\bar{u}$ is a point defined by the voxel-based approximated surface $\widetilde{\partial s}$ (and preferably a center of one of its voxels) that is nearest to a voxel center u for which the signed distance is to be computed.

A displacement map may be computed in a generally known manner, e.g. by ray tracing or ray marching, and/or may be retrieved when determining the primitive-based approximated surface. Alternative ways to compute displacement values depending on the primitives of the primitive-based surface approximation are discussed above, especially with respect to higher-order (e.g. curved) primitives.

The initial signed distance function noted above may thus be expanded as follows (equation 3):

$$f(u) = s(u)\tilde{d}(u) - \phi(\bar{u})$$

where $$\bar{u} = \arg\min_{v \in \widetilde{\partial s}} \|u - v\|_2$$

is the nearest point on $\widetilde{\partial s}$ to a given voxel center u.

A general goal is to later on select voxels 20 that accurately approximate the object 22 to be printed. As will be discussed below, the present embodiment suggests a selection rule based on the displaced signed distances f(u) of the voxel centers u. Accordingly, an accurate determination of the sign s(u) increases the likelihood of making appropriate selections.

This determination of a sign s for each voxel center u takes place in step S4. So far, it has been difficult to accurately deal with so-called sub-voxel boundaries or sub-voxel primitive accumulations at limited computational costs. More precisely, sign determination is challenging when a voxel 20 contains a plurality of primitives. Such an accumulation of primitives in a voxel 20 may occur when the local feature size of the surface approximation data and/or primitive-based approximation is on the order of or below the voxel size. This may occur when geometric structures of the object 22 are too fine-scale to be captured by the printer resolution, the structures e.g. being sharp edges or thin walled or tubular portions of an object 22. Such structures are likely printed with low accuracy if determining inappropriate signs of a surrounding voxels 20 and performing voxel selections based thereon.

A theoretically conceivable approach would be to, on a computational level, determine the signed distances f(u) at a higher resolution. This way, the voxel size may at least locally be decreased so that less primitives are contained therein at the same time. Yet, for printing a downsampling of the voxels 20 would again be necessary. This, however, increases computation time and, due to the downsampling, does not necessarily improve the accuracy.

Accordingly, the present embodiment suggests a different way of dealing with the issue of appropriate sign determination for voxels 20 containing multiple primitives. Generally, this is done by evaluating the orientation of faces of a voxel 20 with respect to each primitive contained therein. The orientation expresses whether the face is on the interior or exterior of a primitive (and/or the surface approximated by the primitive). For doing so, the primitives and more specifically gradients of the signed distance fields defined by individual primitives as described above may be (virtually and/or mathematically) projected onto the direction defined by a line from the voxel center through the center of each face (i.e. boundary) of a voxel 20.

Further, weighting is preferably incorporated to take relative distances between the contained primitives and the faces into account. Overall, a sum of respectively weighted values reflecting the orientations of each voxel face with respect to each contained primitive is computed to determine the sign of the adjacent voxels along a given direction from the voxel (i.e. computing how the sign behaves as a voxel is left and adjacent voxels are entered). This may be representative of whether a part or region of the boundary of a voxel lies rather inside or outside with respect to all the primitives contained therein. Specifically, this may help to overcome ambiguous sign determination when multiple primitives within one voxel are oriented in opposite directions. The weighted sums of the gradients suggested herein, to the contrary, enables making a statement about the sign of points in different directions outside this voxel.

A suitable approach for implementing the above is based on computing a signed distance for each primitive in a voxel 20 and evaluating its change when e.g. moving along defined directions and axes from a voxel center u to each face of a voxel 20. For example, in case of a polygon mesh as a basic primitive-based approximation, the distance of points relative to a plane of each polygon may be considered.

Accordingly, gradients of signed distance functions $\delta_\omega f(u)$ of the primitives p with respect to the voxel center u when moving from the center along a given direction $\omega$ are summed up for each primitive and weighted as noted above, wherein $n_p$ is a normal vector of a primitive expressing a gradient of the signed distance function of a primitive (equation 4):

$$\partial_\omega f(u) = \frac{1}{\sum_{p \in \mathcal{P}} w_p(u, \omega)} \sum_{p \in \mathcal{P}} n_p^T \omega w_p(u, \omega)$$

Preferably, the weights are defined by (equation 5):

$$w_p(u,\omega) = a_p(u) \exp(-(c_p(u)^T \omega - \Delta\omega/2)^2/\sigma^2)$$

where $$\Delta\omega = [\Delta x \Delta y \Delta z]\omega,$$

The term $$c_p(u)^T \omega - \Delta\omega/2$$

gives the distance of the centroid $c_p(u)$ of the intersection of the primitive p with the voxel u from the boundary of the voxel along the direction $\omega$ from its center.

Figure 3:
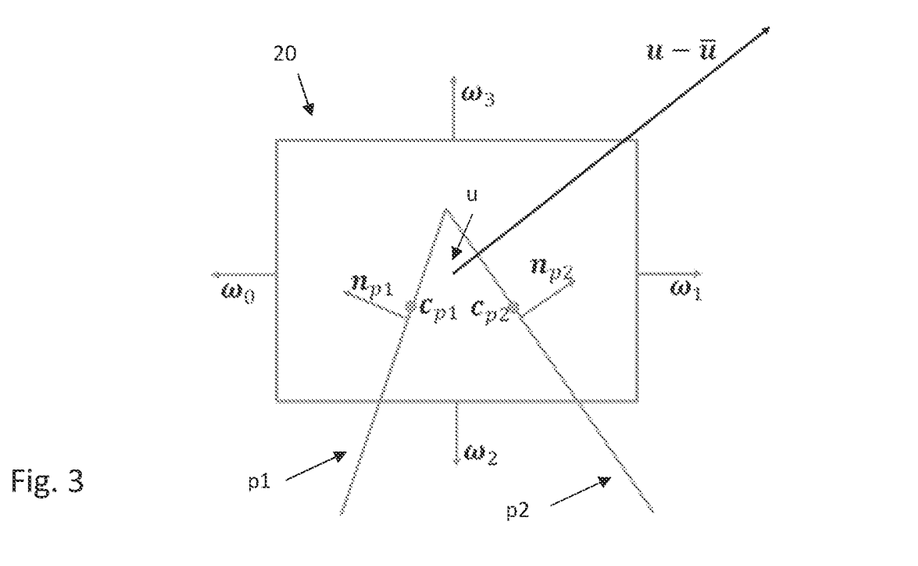
FIG. 3 illustrates a sign determination at sub-voxel accuracy.

The quantities of the above equations 4 and 5 are illustrated in FIG. 3. The figure shows a schematic cross-sectional of a voxel 20, so that four of its six faces are depicted. At each face, a direction $\omega_{0-3}$ is indicated. The voxel 20 is intersected by two primitives $p_{1,2}$ with normal vectors $n_{p1,2}$ and centroids $c_{p1,2}$, respectively.

For closed manifold models (i.e. modelled and/or approximated object surfaces), the overall sign s may thus be determined as follows and by considering a plurality of directions $\omega$ for each primitive (equation 6)

$$s(u) = \text{sign}\left((u-\bar{u})^T \sum_{i=1}^{N_\omega} \omega_i 1_{\mathbb{R}^+}((u-\bar{u})^T \omega_i) \partial_{\omega_i} f(\bar{u})\right)$$

where $1_{\mathbb{R}^+}$ is an indicator function equal to 1 when its argument is >0 and 0 otherwise. $N_\omega$ denotes the number of directions along which the gradients are projected, wherein for the 3D printing at hand the present embodiment considers six directions (e.g. along the positive and negative directions of each axes (x, y, z) of the reference coordinate system).

Specifically, $\omega_1$ and $\omega_2$ preferably correspond to (or extend in parallel to) the negative and positive x-axis of the reference coordinate system, whereas $\omega_3$ and $\omega_4$ correspond to the positive and negative y-axis and $\omega_5$ and $\omega_6$ correspond to the positive and negative z-axis.

The above equations return s(u)=1 if the sum of the gradient projections $\partial_{\omega_i} f(u)$, for which the angle between $\omega_i$, and u−ū (see FIG. 3) is <π/2, is larger than or equal to 0 and returns s(u)=−1 otherwise.

The angle condition is another way of expressing that the scalar (or dot) product $(u-\bar{u}^T)\omega_i$ is greater than 0. This means, for voxels u lying in the +x direction of ū, the gradients for the +x face, but not the −x face, are considered. This applies similarly for the y and z directions.

Note that the gradient projection for +x, $\partial_{\omega_2} f$, may be negative or positive, depending on the primitives p that intersected the voxel 20.

The summation over i produces an (unnormalized) approximation of the normal vector of the surface contained in the voxel 20 in the direction defined by the vector (u−ū). Once this summation is computed, the dot product with the vector (u−ū) is computed and, if the result is negative, s(u)=−1 is output; and s(u)=1 is output otherwise.

With s(u) being computed as noted above and with the distance d and displacement φ being determined according to any of the aspects disclosed herein, a displaced signed distance value f(u) can be computed for every voxel center u. Thus, one arrives at a displaced signed distance field for the voxel-discretized building space.

In an optional step S4, that may be incorporated into the displaced signed distance field determination of step S3 and/or may be used to update or correct the displaced signed distance field, the values of the sign function s(u) are regularized, or in particular, filtered. As previously noted, this may smoothen the sign function and avoid discontinuities caused by an incomplete primitive-based surface approximation. In consequence, the voxel-based surface approximation may equally be at a lower risk of showing such discontinuities.

In an optional step S5, first sub-measures are performed to compensate for self-overlapping portions of the voxel-based surface approximation. In a first sub-step, a floodfill computation (in brief: floodfill) is performed on voxels 20 defined as outside the surface by the (displaced) signed distance function. Generally, a floodfill identifies all voxels 20 belonging to a contiguous region. Contiguity is defined using the same neighborhood as e.g. used in surface extraction, preferably either a 6-neighborhood, a 26-neighborhood or an 18-neighborhood. The following describes the process for a 6-neighborhood, but the description applies equally well to other types of neighborhoods. Two voxels 20 may be considered to belong to the same contiguous region if and only if there is a 6-connected path of outside voxels 20 connecting them. A 6-connected path is formed by sequence of steps from one voxel 20 to one of its 6-neighbors, as is generally known. Regions including voxels 20 on the boundary of the build space 18 are labelled exterior empty regions, whereas other regions are labelled interior empty regions. It is possible to apply the floodfill only to a subset of voxels 20, particularly within a restricted range along the x-, y- and z-axis. The floodfill stops when it reaches the boundary of this range. It is possible to run multiple floodfills, possibly in parallel, on multiple disjoint, possibly adjoining, and ranges of voxels.

In a second sub-step, equivalences between regions extracted in adjoining ranges of voxels 20 may be determined. In particular, two regions may be defined to be equivalent if they are contiguous, and therefore would have been identified as the same contiguous region, had the floodfills not been restricted to the respective ranges. Two regions are equivalent if a voxel 20 from one region has at least one neighbor in the other region, and vice versa by symmetry of the neighborhood. Region equivalence is transitive, meaning if region A is equivalent to region B, and region B is equivalent to region C, then A is equivalent to C and vice versa.

Further if a region is labelled exterior, all regions equivalent to that region are also labelled exterior.

In step S6, voxel selection is performed. This may also be referred to as a voxel-based surface extraction. For doing so, those voxels 20 are selected whose displaced signed distance value is equal to or less than pre-defined threshold τ and who have at least one voxel-neighbor whose displaced signed distance value is greater than the threshold τ. As previously noted, different neighborhood definitions are possible, e.g. a 6-neighborhood, an 18-neighborhood or a 26-neighborhood. Preferably a 6-separating neighborhood is used, resulting in a 6-separating voxel surface.

Any threshold τ may be used, resulting in different erosions or dilations of the true surface. To extract a voxel-precise approximation of the true surface, a value of τ=0 is preferable. In the case of a self-overlapping voxel-based approximation $\widetilde{\partial S}$, it may be preferable to use a slightly larger value of τ on the order of the size of a single voxel 20 to improve numerical stability of the floodfill process, resulting in a slightly dilated surface. In such cases it is possible to erode the surface in a post-process to extract the equivalent surface for τ=0.

As a general aspect that may be combined with any of the disclosed embodiments, it may be desirable to store attributes at the surface voxels 20. For example, in the case of a 3D printing device capable of color 3D printing, it may be desirable to look-up color information from the input (e.g. primitive-based) approximate surface and store it with the extracted surface voxels 20. It may also be desirable to store the initial displacement value φ used to compute the (displaced) signed distance field to allow further manipulation of the surface, such as coating the surface with uniform or varying depth of particular material, such as a clear material, in particular in case the additive manufacturing device 12 is capable of that. Other manipulations are also possible.

Further, as a general aspect that may be combined with any of the disclosed aspects, it may be desirable to examine the (displaced) signed distance field values of neighboring voxels 20 to determine the precise location(s) between voxel centers u where the (displaced) signed distance field equals the pre-defined threshold τ, and store this with the extracted surface voxels. Thus the resulting surface voxels 20 (i.e. the selected voxels) may be used for sub-voxel precise signed distance field computation. It may also be desirable to store the (displaced) signed distance field value of the voxel 20 itself, allowing the extracted surface voxels to be used to compute a different iso-level of the (displaced) signed distance field than the one used for surface extraction.

In the case of input (primitive-based) approximations which self-overlap, it is preferable to store with each extracted surface voxel 20, the adjacent empty regions to that voxel 20, so that the interior or hidden surface voxels 20 may be removed in a subsequent processing step.

In an optional step S7, the measures started in the optional step S5 are completed. Specifically, all surface voxels 20 extracted in step S6 are examined to determine to which empty regions they are adjacent. Surface voxels 20 not adjacent to any exterior empty regions are discarded as "interior" or "hidden" surfaces. Note that compensating for self-overlaps as described herein may be performed for any given number (e.g. chunks) of slices without having to examine the complete build space 18.

In a step S8, the selected voxels 20 are used to define a manufacturing data set that is sent to an additive manufacturing device 12.

Note that at least the above steps S3-S7 may be carried out subsequently for only slices of the object or for respective chunks of slices. As has been explained above, this enables a streaming of manufacturing data to the additive manufacturing device 112 which may start printing the object 22 right away (i.e. even though the voxel selection has not been carried out for the whole of the object 22). It further enables that only a small number of slices need to be stored in memory at any given time, enabling scalability for devices 12 with large build spaces 18 and high resolution.

The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C."

In this application, the term computer-readable medium does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The invention claimed is:

1. A method for selecting voxels for producing a three-dimensional (3D) object with an additive manufacturing device, the additive manufacturing device having a building space that is discretized into virtual voxels, the method comprising:

receiving a voxel-based approximation of a surface of the object, wherein:
the voxel-based approximation includes a 3D surface approximation encompassing multiple surface voxels,
the 3D surface approximation is determined by converting a 3D primitive-based surface approximation of the object into the 3D surface approximation based on the virtual voxels, and
the multiple surface voxels include a subset of the virtual voxels;
determining, for each voxel of a non-empty subset of the virtual voxels of the building space, a signed distance value describing a distance between the voxel and a nearest surface voxel defined by the voxel-based approximation, wherein:
the signed distance value of the voxel is determined based on a displacement value, and
the displacement value indicates a displacement between the nearest surface voxel and a true surface of the object; and
selecting voxels from the non-empty subset of the virtual voxels at which material should be added to produce the object, wherein the selection is performed based on the signed distance values of the selected voxels.

2. The method of claim 1 further comprising generating control signals for making the additive manufacturing device print the material at the selected voxels.

3. The method of claim 2 further comprising controlling the additive manufacturing device with the control signals.

4. The method of claim 1 wherein the displacement value is derived from a displacement map that at least one of (i) includes the voxel-based approximation and (ii) is derived from the voxel-based approximation.

5. The method of claim 1 wherein:
the voxel-based approximation is generated based on surface approximation data; and
the displacement value is derived from a displacement map that at least one of (i) includes the surface approximation data and (ii) is derived from the surface approximation data.

6. The method of claim 5 further comprising generating the voxel-based approximation based on the surface approximation data.

7. The method of claim 5 wherein:
the surface approximation data includes curved polygonals; and
the displacement value is computed based on a distance between a curved polygonal and a non-curved equivalent thereof.

8. The method of claim 7 wherein:
the voxel-based approximation is generated based on surface approximation data;
the displacement value is derived from the displacement map;
the displacement map at least one of (i) includes the voxel-based approximation and (ii) is derived from the voxel-based approximation; and
the displacement map at least one of (i) includes the surface approximation data and (ii) is derived from the surface approximation data.

9. The method of claim 1 wherein each of the selected voxels has a signed distance value indicating that the voxel is located on or inside the object.

10. The method of claim 9 wherein each of the selected voxels has a neighboring voxel whose signed distance value indicates that the neighboring voxel is located outside of the object.

11. The method of claim 1 further comprising determining a sign for a voxel that contains a plurality of primitives used for approximating the surface based on an orientation of at least one face of the voxel relative to the primitives.

12. The method of claim 11 wherein determination of the sign also takes a distance of the primitives to the face into account.

13. The method of claim 1 further comprising locally filtering a sign function that determines the sign of the signed distance value.

14. The method of claim 1 further comprising identifying and discarding self-overlapping portions of the voxel-based approximation based on a floodfill computation.

15. A computer device for generating manufacturing data for an additive manufacturing device, the additive manufacturing device having a building space that is discretized into virtual voxels, the computer device comprising:
memory that is configured to store executable instructions; and
at least one processor that is configured to execute the executable instructions from the memory, wherein the executable instructions cause the at least one processor to perform:
receiving a voxel-based approximation of a surface of a three-dimensional (3D) object, wherein:
the voxel-based approximation includes a 3D approximation encompassing multiple surface voxels,
the 3D surface approximation is determined by converting a 3D primitive-based surface approximation of the object into the 3D surface approximation based on the virtual voxels, and
the multiple surface voxels include a subset of the virtual voxels;
determining, for each of at least a non-empty subset of the virtual voxels of the building space, a signed distance value describing a distance between each voxel and a nearest surface voxel defined by the voxel-based approximation, wherein:
the signed distance value of the voxel is determined based on a displacement value, and
the displacement value indicates a displacement between the nearest surface voxel and a true surface of the object;
generating manufacturing data by selecting voxels from the non-empty subset of the virtual voxels at which material should be printed to produce the object, wherein the selection is performed based on the signed distance values of the selected voxels; and
outputting the manufacturing data to the additive manufacturing device.

16. An additive manufacturing system comprising the computer device of claim 15 and the additive manufacturing device.

17. A non-transitory computer-readable medium comprising:
processor-executable instructions,
wherein the processor-executable instructions include:
receiving a voxel-based approximation of a surface of a three-dimensional (3D) object, wherein:
the voxel-based approximation includes a 3D surface approximation encompassing multiple surface voxels,
the 3D surface approximation is determined by converting a 3D primitive-based surface approximation of the object into the 3D surface approximation based on virtual voxels of a building space, and
the multiple surface voxels include a subset of the virtual voxels;
determining, for each voxel of a non-empty subset of the virtual voxels of the building space, a signed distance value describing a distance between the voxel and a nearest surface voxel defined by the voxel-based approximation, wherein:
the signed distance value of the voxel is determined based on a displacement value, and
the displacement value indicates a displacement between the nearest surface voxel and a true surface of the object; and
selecting voxels of the non-empty subset of the virtual voxels at which material should be added to produce the object, wherein the selection is performed based on the signed distance values of the selected voxels.

18. The computer-readable medium of claim 17 wherein the processor-executable instructions further include generating control signals for making an additive manufacturing device print material at the selected voxels.

19. The computer-readable medium of claim 18 wherein the processor-executable instructions further include controlling the additive manufacturing device with the control signals.

20. The method of claim 1, wherein the displacement value indicates the displacement along a direction of a normal vector of a primitive of the 3D primitive-based surface approximation that is intersecting the voxel.

* * * * *